United States Patent
Viradiya et al.

(10) Patent No.: US 10,686,734 B2
(45) Date of Patent: Jun. 16, 2020

(54) NETWORK SWITCH WITH INTERCONNECTED MEMBER NODES

(71) Applicant: HEWLETT PACKARD ENTERPRISE DEVELOPMENT LP, Houston, TX (US)

(72) Inventors: Rahul Viradiya, Bangalore (IN); Harish Shivaram, Bangalore (IN); Hemant Mishra, Bangalore (IN); Daniel N. Goodman, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 323 days.

(21) Appl. No.: 15/716,123

(22) Filed: Sep. 26, 2017

(65) Prior Publication Data

US 2019/0097949 A1 Mar. 28, 2019

(51) Int. Cl.
| G06F 15/16 | (2006.01) |
| H04L 12/931 | (2013.01) |
| H04L 12/707 | (2013.01) |
| H04L 12/721 | (2013.01) |

(52) U.S. Cl.
CPC ............ H04L 49/70 (2013.01); H04L 49/604 (2013.01); H04L 45/12 (2013.01); H04L 45/24 (2013.01); H04L 49/351 (2013.01)

(58) Field of Classification Search
CPC .................. H04L 49/604; H04L 49/351; H04L 29/08072; H04L 29/06; H04L 49/70
See application file for complete search history.

(56) References Cited

U.S. PATENT DOCUMENTS

| 6,658,479 B1 * | 12/2003 | Zaumen ................. H04L 29/06 370/254 |
| 9,015,299 B1 * | 4/2015 | Shah ...................... H04L 29/06 709/223 |
| 9,042,234 B1 | 5/2015 | Liljenstolpe et al. |
| 9,203,738 B2 | 12/2015 | Yang et al. |
| 9,391,844 B2 | 7/2016 | Kashyap et al. |
| 9,628,336 B2 | 4/2017 | Vobbilisetty et al. |
| 9,674,088 B1 * | 6/2017 | Sivaramakrishnan ...................... H04L 45/7453 |
| 2003/0107996 A1 * | 6/2003 | Black .................... H04L 49/357 370/235 |

(Continued)

OTHER PUBLICATIONS

Cisco Systems, Inc., "Integrating the Virtual Switching System in Cisco Data Center Infrastructure," Mar. 20, 2009, pp. 1-54. http://www.cisco.com/c/en/us/td/docs/solutions/Enterprise/Data_Center/vssdc_integrate.html.

*Primary Examiner* — Razu A Miah
(74) *Attorney, Agent, or Firm* — Mannava & Kang, P.C.

(57) ABSTRACT

According to examples, a network switch may include plurality of member nodes interconnected by member links to exchange data plane traffic. The network switch may also include a commander node to run control and management plane protocols for the plurality of member nodes. A first member node of the plurality of member nodes that receives a packet incoming into the network switch calculates a forwarding path for the packet to a destination through a second member node of the plurality of member nodes and forwards the packet to the second member node, and the second member node forwards the packet according to the forwarding path calculated by the first member node without calculating another forwarding path for the packet.

20 Claims, 4 Drawing Sheets

(56) References Cited

U.S. PATENT DOCUMENTS

| | | | |
|---|---|---|---|
| 2003/0149755 A1* | 8/2003 | Sadot | H04L 29/06 709/223 |
| 2004/0047294 A1* | 3/2004 | Ain | H04L 25/4908 370/238 |
| 2005/0091396 A1* | 4/2005 | Nilakantan | H04L 45/04 709/232 |
| 2005/0138200 A1* | 6/2005 | Liu | H04L 29/06 709/238 |
| 2006/0268742 A1* | 11/2006 | Chu | H04L 41/12 370/254 |
| 2007/0036178 A1 | 2/2007 | Hares et al. | |
| 2008/0186968 A1* | 8/2008 | Farinacci | H04L 12/4633 370/392 |
| 2009/0185560 A1* | 7/2009 | Venkatesan | H04L 45/24 370/389 |
| 2009/0290486 A1* | 11/2009 | Wang | H04L 12/437 370/222 |
| 2011/0075664 A1* | 3/2011 | Lambeth | H04L 45/04 370/390 |
| 2011/0228767 A1* | 9/2011 | Singla | H04L 49/00 370/389 |
| 2012/0170575 A1* | 7/2012 | Mehra | H04L 41/00 370/359 |
| 2013/0031258 A1* | 1/2013 | Mukai | H04L 12/6418 709/227 |
| 2014/0161132 A1* | 6/2014 | Tatsumi | H04L 49/557 370/401 |
| 2014/0280457 A1* | 9/2014 | Anton | G06F 16/256 709/202 |
| 2014/0351443 A1* | 11/2014 | Tang | G06F 9/45533 709/226 |
| 2015/0244617 A1* | 8/2015 | Nakil | G06F 9/45558 709/224 |
| 2015/0304194 A1* | 10/2015 | Ghose | H04L 45/586 370/392 |
| 2016/0205071 A1* | 7/2016 | Cooper | H04L 12/6418 726/1 |

* cited by examiner

NETWORK SWITCH WITH INTERCONNECTED MEMBER NODES

BACKGROUND

In front plane stacking or switch stacking, a plurality of physical switches are virtualized into one virtual switch. The use of front plane stacking generally provides a relatively high level of resiliency, scalability, and higher bandwidth than any of the individual physical switches may provide individually. In addition, front plane stacking supports the use of dedicated point-to-point Ethernet (e.g., copper or fiber) links to interconnect the physical switches. The dedicated point-to-point Ethernet links may carry data plane traffic and may also exchange control plane traffic. The interconnection of the physical switches through such links enables the front plane stacked physical switches to be assigned a single IP address and to appear to users as a single switch.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
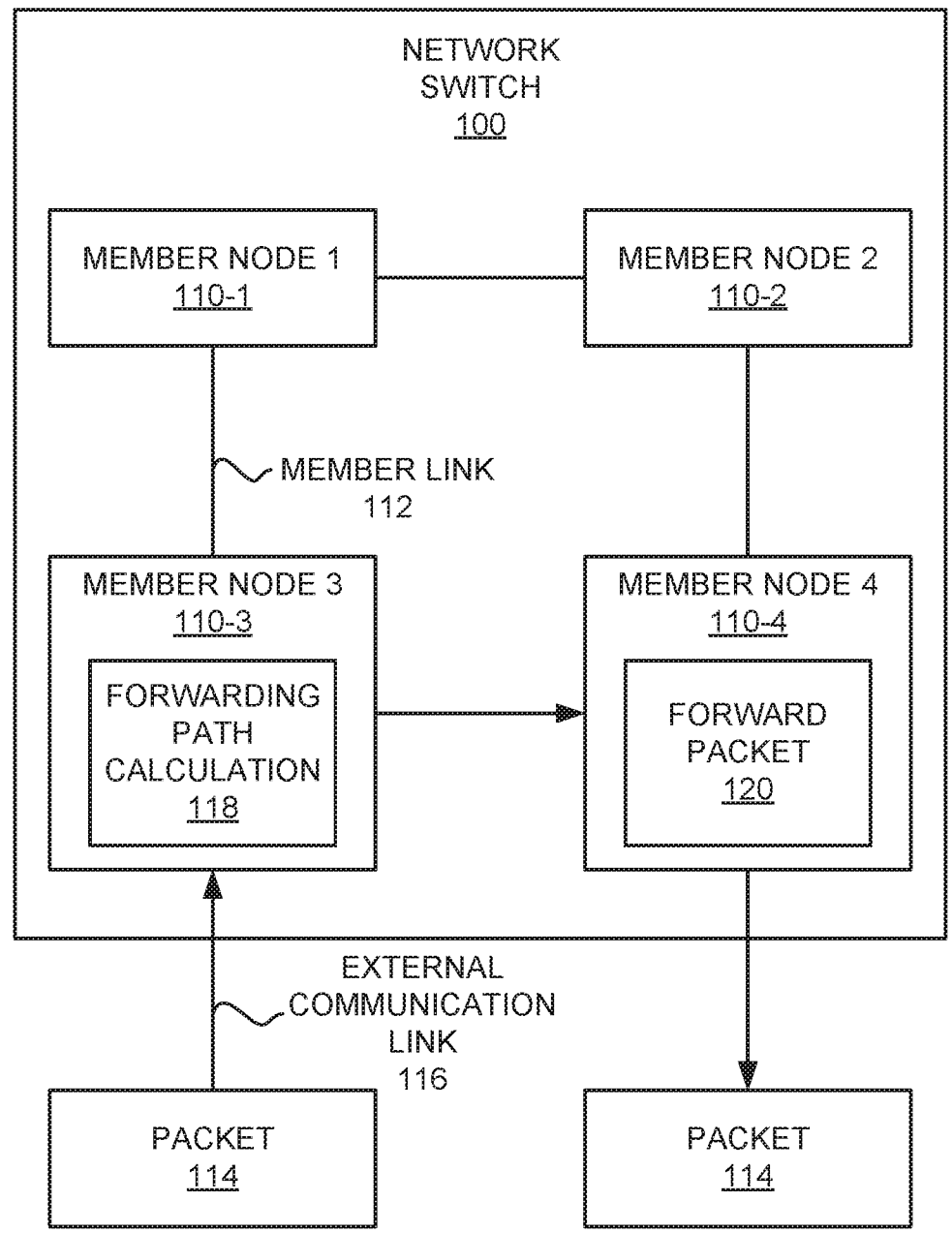
FIG. 1 shows a block diagram of an example network switch that may implement front plane stacking.

For simplicity and illustrative purposes, the present disclosure is described by referring mainly to embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are network switches including a plurality of interconnected member nodes. The member nodes may each be a physical switch and the network switches disclosed herein may be termed a front plane stacked switch or a virtual switch. That is, the member nodes may be interconnected and may function as a single virtual switch. Each of the member nodes may include a topology manager that detects a topology of the member nodes and identifies forwarding paths through the virtual switch for packets that the member nodes receive. In addition, an ingress member node that receives the packet from a source external to the network switch may calculate a forwarding path for the packet and may forward the packet to a second member node in the virtual switch. The second member node may forward the packet according to the previously calculated forwarding path without calculating another forwarding path.

The topology managers in each of the member nodes may build adjacency maps and may detect the network topology from the adjacency maps. The topology managers may further determine uni-destination traffic forwarding paths and multi-destination traffic forwarding paths from the adjacency maps. In addition, the topology managers may program a respective ASIC in the member nodes with the determined forwarding path intelligence. As noted herein, an ingress member node may calculate a forwarding path for a packet received via an external communication link to the ingress member node and another member node that receives the packet from the ingress member node may forward the packet according to the calculated forwarding path. That is, the other member node may not calculate another forwarding path prior to forwarding the packet. In one regard, therefore, the amount of computational processing performed on a member node of the network switch disclosed herein may be reduced or minimized, which may reduce the power consumption and the processing time required to process packets for forwarding to another member node or to a destination outside of the network switch. Thus, for instance, through implementation of the network switches and the methods disclosed herein, packets may be switched in a relatively more efficient manner as compared with having each of the member nodes in a network switch perform separate forwarding path calculations.

As used herein, the term "network switch" may refer to a plurality of member nodes (physical switches) that are interconnected via member links to function as a single logical switch. The interconnected member nodes may additionally or in other examples be termed a virtual switch, a logical switch, a front plane stack virtual switch, a fabric switch, a virtual switching framework, or the like. The terms "packet," "data packet," or "frame" may refer to a group of bits that may be transported together across a network. In one regard, these terms should not be construed as being limited to Layer 2 or Layer 3 traffic. Instead, these terms may be used interchangeably herein to refer to traffic that may be communicated over either or both Layer 2 or Layer 3 networks.

With reference first to FIG. 1, there is shown a block diagram of an example network switch 100 that may implement front plane stacking. It should be understood that the network switch 100 depicted in FIG. 1 may include additional components and that some of the components described herein may be removed and/or modified without departing from a scope of the network switch 100.

According to examples, the network switch 100 may be a virtual or, equivalently, a logical switch, that is composed of a plurality of physical member nodes 110-1 to 110-4. Each of the physical member nodes 110-1 to 110-4, which are also referenced herein as member nodes 110, may be a physical switch. As such, each of the member nodes 110 may include a plurality of ports in which some of the ports may be dedicated for external communications, e.g., to be coupled to hosts or other switches external to the network switch 100 via external communication links. In some examples, less than all of the member nodes 110 may include ports that are dedicated for external communications.

The member nodes 110 may be interconnected with each other through member links 112 via some of the ports. The member links 112 may be dedicated point-to-point links, e.g., Ethernet links, and may also be physical links, such as copper, fiber, etc., links between the member nodes 110. The member links 112 may also be referenced as front plane stacking links. In one regard, the member links 112 may form a logical interface among the member nodes 110. As discussed herein, the member nodes 110 may use the logical interface to carry data plane traffic and to also exchange control plane traffic. The member nodes 110 may use the exchanged control plane traffic to maintain the topology of the member nodes 110 as discussed herein. The logical interface may also enable the member nodes 110 to function as a single network switch, e.g., may be assigned a single IP address.

The member nodes 110 may be configured in a number of different types of topologies. In the example depicted in FIG. 1, the member nodes 110 has been depicted as being configured in a four member ring topology. In other examples, the member nodes 110 may be configured in a chain topology. Although the network switch 100 has been depicted with four member nodes 110, it should be understood that the network switch 100 may include a lesser or a greater number of member nodes without departing from a scope of the network switch 100 disclosed herein. By way of particular example, the network switch 100 may include ten member nodes 110 configured in a ring or chain topology.

According to examples, one of the member nodes 110-1 in the network switch 100 may function as a commander node and another one of the member nodes 110-2 may function as a standby node. The commander node 110-1 may run control and management plane protocols for the member nodes 110. The commander node 110-1 may also manage forwarding databases and may synchronize the forwarding databases with the standby node 110-2. The commander node 110-1 may further control all of the line cards in the network switch 100, including the line card in the standby node 110-2. The standby node 110-2 may be a state-full backup device to the commander node 110-1. The standby node 110-2 may remain in a standby mode and may be ready to take control of the network switch 100 if the commander node 110-1 fails. As such, for instance, the network switch 100 may continue operating seamlessly during a commander node 110-1 failure.

The member nodes 110-3 and 110-4 other than the commander node 110-1 and the standby node 110-2 may not run networking protocols and may not have states. In addition, the ports on these member nodes 110-3 and 110-4 may be directly controlled and programmed by the commander node 110-1. Moreover, when the commander node 110-1 fails and the standby node 110-2 is promoted to become the commander node 110-1, one of the other member nodes 110-3 or 110-4 may become a standby node. The selection of the member node 110-3 or 110-4 to become the standby node may be made in any suitable manner, e.g., based upon the member node number, configured member priority, etc.

As shown in FIG. 1, a member node 110-3 may receive an incoming packet 114 through a port on the member node 110-3 that is dedicated for external communications. For instance, the member node 110-3 may receive the incoming packet 114 from an external host or an external switch via a port that is connected to an external communication link 116. The member node 110-3 may process the incoming packet 114 to perform a forwarding path calculation 118 on the incoming packet 114. That is, for instance, an application specific integrated circuit (ASIC) of the member node 110-3 may perform the forwarding path calculation on the incoming packet 114 to determine which of the member nodes 110-1 to 110-4 the packet 114 is to be forwarded for the packet 114 to be correctly outputted from the network switch 100 to reach the destination of the packet 114.

As shown in FIG. 1, calculation of the forwarding path 118 may result in a determination that the packet 114 is to be forwarded through another member node 110-4 and that the member node 110-4 is to output the packet 114 through a port that is dedicated for external communications. According to examples, the member node 110-3 may forward/relay the packet 114 with header information including the forwarding path calculation. That is, for instance, the member node 110-3 may forward/relay the packet 114 with information indicating that the packet 114 is to be forwarded/relayed to the member node 110-4 and that the member node 110-4 is to externally output the packet 114 from the network switch 100. As used herein, a forwarded packet may equivalently be defined as a relayed packet. The member node 110-3 may also forward the packet 114, which may also be termed a data plane packet or data plane traffic, to the member node 110-4 through a dedicated point-to-point member link 112 with the member node 110-4.

The member node 110-4, e.g., the ASIC in the member node 110-4, may process the forwarded packet 114 to determine how to further forward the packet 114. That is, the member node 110-4 may access the forwarding path information contained in the header of the forwarded packet 114 and may forward the packet 114 according to that information. In other words, the member node 110-4 may determine the next hop or the next destination for the forwarded packet 114 based upon the forwarding path calculated by the member node 110-3. The member node 110-4 may thus forward 120 the packet 114 without calculating another forwarding path for the packet 114. In instances in which the member node 110-4 forwards the packet 114 out of the network switch 110, the member node 110-4 may remove the encapsulation from the packet 114 prior to forwarding the packet 114 out of the network switch 100.

Although the member node 110-4 is depicted as forwarding the packet 114 out of the network switch 100, the member node 110-4 may instead forward the packet 114 to another member node 110-2 depending upon the information pertaining to the forwarding path calculated by the member node 110-3 contained in the packet 114. In one regard, by calculating the forwarding path of the packet 114 in a single member node 110-3 instead of individually at each of the member nodes 110 that receive the packet 114, the amount of processing performed by the member nodes 110 may be reduced.

According to examples, the member node 110-1 that functions as a commander node and the member node 110-2 that functions as a standby node in the network switch 100 may also be involved in the forwarding of packets through the network switch 100. That is, a member node 110-3 that receives the packet 114 from an external communication port may include the commander node 110-1 and/or the standby node 110-2 in calculating the forwarding path 118 for the packet 114. In other examples, however, the member node 110-3 may not include the commander node 110-1 and/or the standby node 110-2 in calculating the forwarding path 118 for the packet 114.

Figure 2:
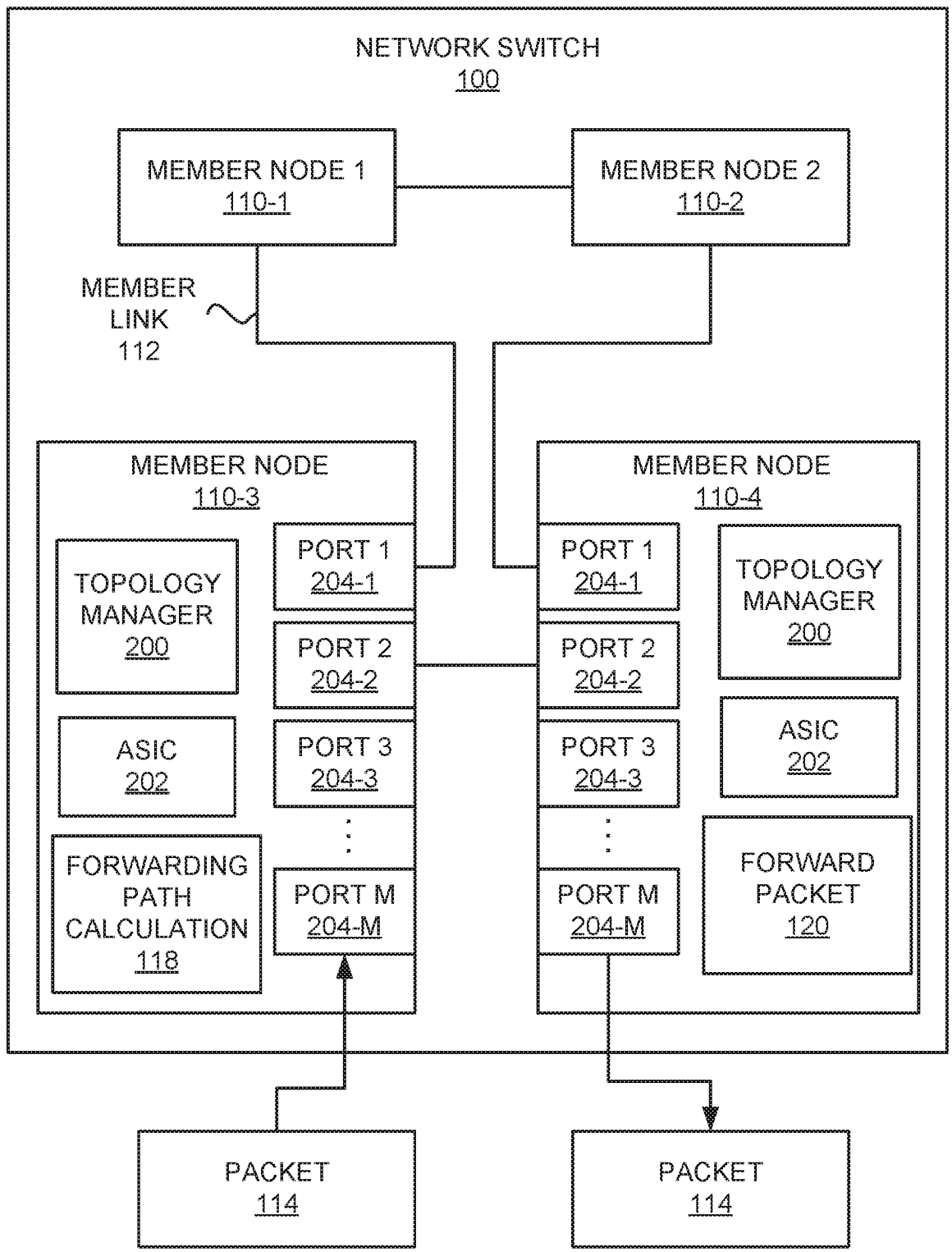
FIG. 2 shows another block diagram of the example network switch depicted in FIG. 1.

Turning now to FIG. 2, there is shown another block diagram of the example network switch 100 depicted in FIG. 1. The network switch 100 depicted in FIG. 2 includes the same features as those discussed above with respect to the network switch 100 depicted in FIG. 1. However, additional detail with respect to the member nodes 110 is provided in FIG. 2. That is, the member nodes 110-3 and 110-4 are depicted as each including a topology manager 200, an ASIC 202, and a plurality of ports 204-1 to 204-M, in which the variable "M" may represent an integer greater than one. The member nodes 110-1 and 110-2 as well as any additional member nodes included in the network switch 100 may have similar elements.

The topology manager 200 may be machine readable instructions stored on a memory that may be executed by a processor on the member node 110. In any of these examples, the topology manager 200 in a member node 110 may perform various functions for that member node 110. These functions may include, for instance, identifying a topology type of the network switch 100. That is, the topology manager 200 of a member node 110 may send and receive control plane traffic to the topology managers 200 in the other member nodes 110 and may identify the topology type from information contained in the control plane traffic. For instance, the topology managers 200 may determine that the network switch 100 has a chain topology, a ring topology, or a standalone topology. In this regard, the topology managers 200 of each of the member nodes 110 may identify the topology type individually, e.g., a single topology manager may not identify the topology type and forward the identified topology type to the other topology managers. In addition, the topology managers 200 may identify the topology type each time a change to the topology occurs.

Each of the topology managers 200 may calculate the topology type based on an adjacency map, which identifies which of the member nodes 110 are adjacent to which other ones of the member nodes 110. That is, for instance, the topology managers 200 may execute a stacking protocol that runs a topology discovery algorithm and builds the adjacency map. The adjacency map may include a list of all of the physically present member nodes 110 and the peers of each member node 110 connected via each member link 112 of the member node 110. Each of the topology managers 200 may independently run the topology discovery algorithm and the topology discovery algorithm may start from a lowered number member node 110 present in the adjacency map to identify the topology type. The topology discovery algorithm may walk through all of the member links 112 recursively to find the longest chain or ring available. In addition, to maintain the uniform forwarding paths across each member node 110 for the ring topology, the direction of the ring may be determined in the direction from the lowest member link 112 number on the lowest numbered member node 110 in the adjacency map.

Each of the topology managers 200 of the member nodes 110 may also use the information contained in the control plane traffic to identify the shortest path for uni-destination traffic to each other member node 110. By way of example, the topology managers 200 may identify the shortest paths through implementation of the Dijkstra's shortest path algorithm. Once the shortest path is identified, multiple strategies may be employed to achieve rapid recovery during a topology change, to achieve no or minimal disruption of traffic that is already flowing, to achieve minimal latency for traffic through the member nodes 110, etc. According to examples, the topology managers 200 may derive the forwarding paths for uni-destination traffic from the adjacency maps.

The criteria for link/path costs may include aggregated link capacity and path hop count. The topology managers 200 may consider only hop count to determine the path costs and may use a shortest path algorithm, e.g., Dijkstra's shortest path algorithm, to determine reachability to each member node 110. For instance, the topology managers 200 may not take link capacity into account for a number of reasons. By way of example, including link capacity in the shortest path computation may cause the traffic direction to change more frequently than when including just hop counts. As another example, the shortest path computation is expensive and changing directions may cause loss of inflight traffic. As a further example, including the link capacity may defeat the purpose of having multiple ports aggregated in links because dropping even one port may trigger a topology change even though the other ports are still forwarding traffic. As a yet further example, including in the link capacity may make it more difficult to troubleshoot traffic forwarding issues.

According to examples, the member links 112 in the network switch 100 may be of uniform capacity with respect to each other. As such, for instance, the aggregated capacity of all of the member links 112 may be the same. If one of the ports in a member link 112 goes down, causing the link capacities to change, a forwarding path recalculation may not be triggered. Instead, a port in a member link 112 going down may be treated as a fabric failure and warnings to the effect that the network switch 100 is running on a degenerated fabric may be outputted.

Each of the topology managers 200 of the member nodes 110 may further identify equal-cost paths between a member node 110 and the other member nodes 110, if any. The topology managers 200 may select a forwarding path that matches a prior forwarding path, for example, in instances in which the costs for multiple forwarding paths are the same. Each of the topology managers 200 may identify the forwarding path for multi-destination traffic that originates on each of the member nodes 110 through the network switch 100. Each of the topology managers 200 may also identify multi-destination traffic relay/exit paths through the member nodes 110.

Each of the topology managers 200 may further program an ASIC 202 of a respective member node 110 with forwarding paths for uni-destination traffic, for instance, based on the destinations of the uni-destination traffic. Each of the topology managers 200 may further program the ASIC 202 with forwarding paths and relay/exit paths for multi-destination traffic originating from each of the other member nodes 110. The topology managers 200 may further distribute the path and cost information to other features in the member nodes 110 for their calculations. For instance, for aggregated ports, the uni-destination path may be used to identify the nearest member node 110 with aggregated member ports, and thus, the optimal path for sending traffic to the aggregation. As another example, for tunneled traffic and mirrored traffic, uni-destination path may be used to identify the optimal path to the tunnel/mirror entry point.

As also shown in FIG. 2, a first port 204-1 in the third member node 110-3 may be coupled to the first member node 110-1 via a member link 112 and a second port 204-2 in the member node 110-3 may be coupled to a second port 204-2 in the fourth member node 110-4 via a member link 112. In addition, the first port 204-1 in the fourth member node 110-4 may be coupled to the second member node 110-2 via a member link 112. Moreover, the ports 204-M in the third member node 110-3 and the fourth member node 110-4 may be coupled to external devices, e.g., may be dedicated to communications external to the network switch 100.

In a chain topology, a single path may exist from a member node 110 to any other member node 110. As such, for instance, there may be only one possible path from one member node 110 to any other member node 110. In a ring topology, the uni-destination traffic flow may take the shortest hops for each member node 110 to reach any other member node 110. In instances in which there are two equal cost paths between member nodes 110, a determination may be made as to whether a prior path currently programmed in the member node 110 is one of the equal cost paths. If so, the existing path is retained as the lowest cost path to, for instance, reduce or eliminate disruption of in-flight traffic during a topology change.

However, if the prior path does not exist or the prior path has a higher cost, the topology manager 200 may identify a ring direction. The ring direction may be defined in the direction starting from the lowest member link 112 number on the lowest numbered member node 110 toward the next lowest member link 112 number and traversing the ring. When there are equal cost paths, the path that follows the ring direction may be selected. By way of example with respect to FIG. 2, the ring direction may be clockwise because the first member node 110-1 has the lowest number and the member link 112 to the second member node 110-2 may have a lower number than the member link 112 to the third member node 110-3. Thus, for instance, the uni-destination path programming for these member nodes may be as follows:

TABLE 1

| From | To | | | |
|---|---|---|---|---|
| | 110-1 | 110-2 | 110-3 | 110-4 |
| 110-1 | | 1 → 2 | 1 → 3 | 1 → 2 → 4 |
| 110-2 | 2 → 1 | | 2 → 4 → 3 | 2 → 4 |
| 110-3 | 3 → 1 | 3 → 1 → 2 | | 3 → 4 |
| 110-4 | 4 → 3 → 1 | 4 → 2 | 4 → 3 | |

As noted in table 1, each of the 2 hop paths may be programmed in a forwarding table to be in the direction of the determined ring. Similar arrangements of uni-destination paths may be identified for a counter-clockwise ring direction. However, the 2 hop paths may be opposite those shown in table 1.

According to examples, on topology change events, the best path may be updated in response to the new path cost being cheaper than the existing path cost. Thus, for instance, an existing traffic path may not be updated with a new traffic path if the costs for these paths are the same. This may reduce or minimize drops in existing traffic flow. In instances in which a network switch 100 having a ring topology is changed to have a chain topology, for instance, through removal or shutdown of a member node 110, the topology managers 200 may reprogram the ASICs 202 to follow the chain topology. That is, there may be a single path from any member node 110 to any other member node 110 when this change occurs.

For multi-destination traffic, the network switch 100 may support egress traffic replication. Thus, for instance, the member nodes 110 may send the multi-destination traffic in a path or in multiple paths so that the traffic reaches each of the other member nodes 110. Each of the member nodes 110 may do a lookup (on the egress side) on a lookup table stored in a member of the member node 110, may identify the ports of the member node 110 that packets are to be delivered through to reach their intended destinations, to determine if the member node 110 is to deliver the traffic on ports of the member node 110. If so, the member node 110 may deliver the traffic locally. The traffic may also be relayed further to other member nodes 110. To avoid duplicate traffic, a "stack exit" point or points may also be identified. An exit point may be a member node 110 that will locally deliver traffic, but does not relay the traffic. The traffic to be "exited" may be identified by the ingress member node 110 of the traffic, e.g., the member node 110 that received the traffic through an external communication port.

The topology manager 200 of the ingress member node 110 may have the responsibility of computing the forwarding path or paths for the multi-destination packets. The topology managers 200 in each of the member nodes 110 may identify the stack relay or stack exit action for the multi-destination traffic that originates (ingress) on each other member in the stack. The topology managers 200 may program this information in the respective ASICs 202.

For multi-destination traffic in a network switch 100 having a chain topology, the multi-destination traffic may be sent across both the links on intermediate member nodes 110. The end of the chain member nodes 110 may be configured as exit points and the remaining member nodes 110 may be configured as relays for the multi-destination traffic. For multi-destination traffic in a network switch 100 having a ring topology, in one example, the multi-destination traffic may be sent either in the direction of the determined ring and the exit point may be configured to be the furthest member node 110 from the ingress member node 110 in the ring. In another example, the multi-destination traffic may be sent across multiple member links 112, and two exit points may be determined on intermediate member nodes 110.

As noted above, in addition to identifying the traffic forwarding paths for the member nodes 110, the topology managers 200 may program the identified traffic forwarding paths into the ASICs 202 of the member nodes 110. The member nodes 110 may each have one or more ASICs 202 and the topology managers 200 in the member nodes 110 may program each of the one or more ASICs 202. In any regard, the member nodes 110 may provide a number of tables that may be used to program the forwarding paths into the ASICs 202. A first table may be a uni-destination path table that may include one entry for every physical member node 110 in the network switch 100, and one entry for each aggregated link (L-agg) that may be configured. Each of the entries in the uni-destination table may be programmed with the member link 112 number to be taken to reach a destination. The programmed value may also be a directive to deliver traffic locally or to drop the traffic entirely.

A second table may be a multi-destination entry table, which may be a single directive indicating how multi-destination traffic originally received on the current member node 110 is to be sent to the other member nodes 110. This table may be programmed into an ASIC 202 to cause the ASIC 202 to send multi-destination traffic on either one of the member links 112 or both member links 112. A third table may be a multi-destination relay table that may include one entry for each member node 110 in the network switch 100. When multi-destination traffic is received from a member link 112, the ASIC 202 may use the originating stack member index to perform a look-up in the multi-destination relay table to decide how to relay the multi-destination traffic. Each entry may indicate whether to send the multi-destination traffic on another member link or links 112 or to deliver the traffic locally.

The ASICs 202 in each of the member nodes 110 may send certain types of traffic to the commander node for processing, e.g., switching/routing protocol packets, packets destined for the commander node, etc. As such, for instance, each of the ASICs 202 may be programmed with the path to reach the commander node. The ASICs 202 may be programmed with a single directive indicating whether such traffic should be sent on a specific member link 112 or delivered locally, for instance, if the ASIC 202 is on the commander node. The path to the commander node may be changed when the commander node changes, e.g., due to a failure of a commander node. When this occurs, the ASICs 202 may be programmed with the new path to the commander node.

Figure 3:
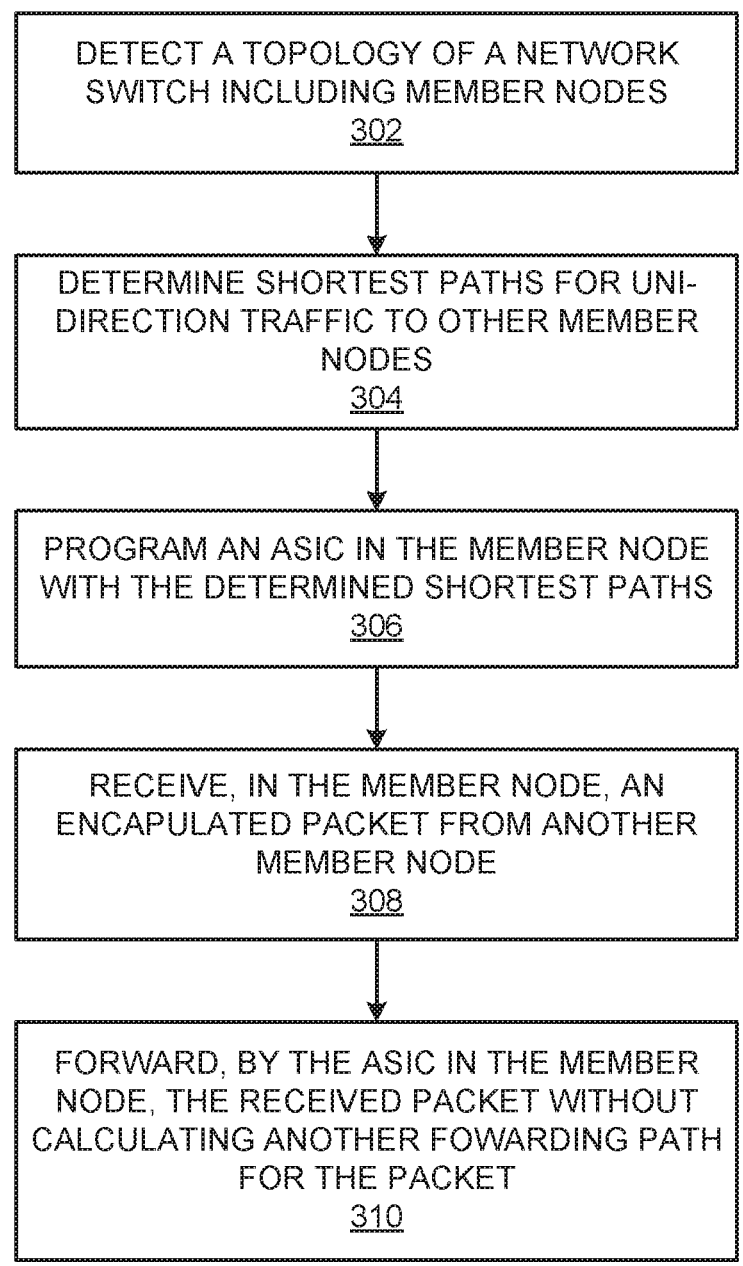
FIGS. 3 and 4, respectively, depict flow diagrams of example methods for operating a network switch.
Figure 4:
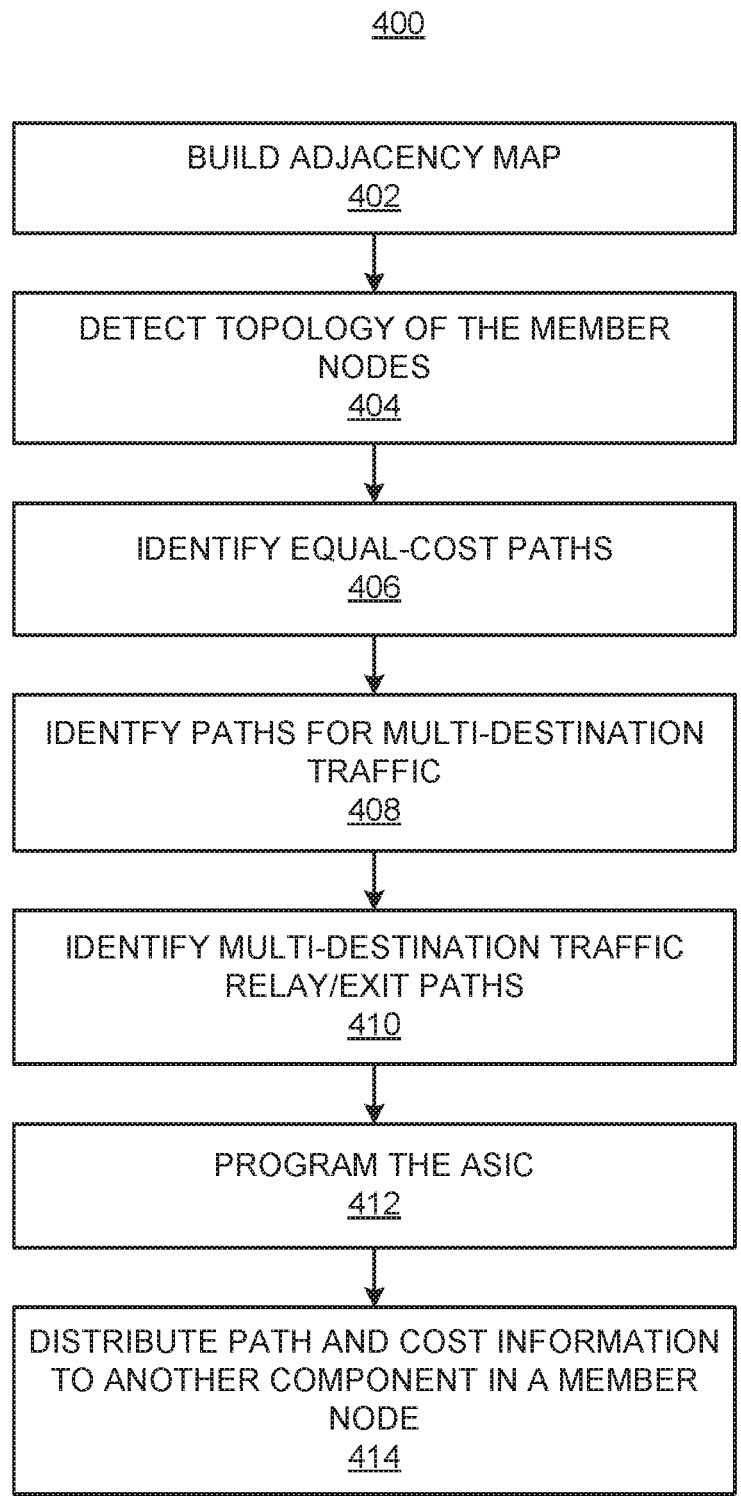

Turning now to FIGS. 3 and 4, there are respectively shown flow diagrams of example methods 300 and 400 for operating a network switch 110 including a plurality of member nodes 110 interconnected by member links 112. It should be understood that the methods 300 and 400 depicted in FIGS. 3 and 4 may include additional operations and that some of the operations described therein may be removed and/or modified without departing from scopes of the methods 300 and 400. The descriptions of the methods 300 and 400 are also made with reference to the features depicted in FIGS. 1 and 2 for purposes of illustration. Particularly, each of the topology managers 200 of the member nodes 110 may individually execute some or all of the operations included in the methods 300 and 400. Thus, although reference is made herein to a particular topology manager 200 of a particular member node 110-1, it should be understood that the topology managers 200 of the other member nodes 110-2 to 110-4 may also perform similar operations.

With reference first to FIG. 3, at block 302, a topology manager 200 of a member node 110-1 may detect a topology of a network switch 100 that includes a plurality of member nodes 110. As discussed above, the topology manager 200 may run a topology discovery algorithm to build an adjacency map and may detect the topology of the network switch 100 from the adjacency map.

At block 304, the topology manager 200 may determine shortest paths for uni-destination traffic to the other member nodes 110 in the plurality of member nodes 110 included in the network switch 100. The topology manager 200 may determine the shortest paths for uni-destination traffic to the other member nodes 110 in any of the manners discussed above.

At block 306, the topology manager 200 may program an ASIC 202 (or multiple ASICs 202) in the member node 110 with the determined shortest paths for uni-destination traffic to the other member nodes 110. The topology manager 200 may program the ASIC(s) 202 in any of the manners discussed above. The topology manager 200 may also determine equal-cost paths and paths for multi-destination traffic and may program the ASIC(s) 202 with the determined equal-cost paths and paths for multi-destination traffic as also discussed above. Each of the topology managers 200 may individually determine the shortest paths and may individually program the ASICs 202 in the respective member nodes 110.

At block 308, the member node 110-4 may receive a packet 114 from another member node 110-3 via a member link 112. The packet 114 may include a forwarding path for the packet 114 that the member node 110-4 is to follow for the packet 114. That is, the other member node 110-3 may have calculated the forwarding path for the packet 114 and may have included the calculated forwarding path in the packet 114. In addition, the member node 110-4 may process the packet 114 to determine the forwarding path for the packet 114 to be taken by the member node 110-4.

At block 310, the ASIC 202 in the member node 110-4 may forward the received packet 114 without calculating another forwarding path for the packet 114. That is, the ASIC 202 may apply the previously calculated forwarding path for the packet 114. Depending upon the previously calculated forwarding path, the ASIC 202 may forward the packet 114 to another member node 110-2, in which the ASIC 202 may maintain the encapsulation of the packet 114 when forwarding the packet 114. Alternatively, the ASIC 202 may forward the packet 114 out of the network switch 100, e.g., through an external communication link, in which the ASIC 202 may remove the encapsulation of the packet 114 prior to forwarding the packet 114.

Turning now to FIG. 4, at block 402, a topology manager 200 of a member node 110 may build an adjacency map, for instance, through implementation of a topology discovery algorithm. The adjacency map may include a list of all of the physically present member nodes 110 and the peers of each member node 110 connected via each member link 112 of the member node 110. Each of the topology managers 200 may independently run the topology discovery algorithm and the topology discovery algorithm may start from a lowered number member node 110 present in the adjacency map to identify the topology type. In addition, at block 404, the topology manager 200 may detect a topology of the member nodes 110, e.g., the topology the network switch 100.

At block 406, the topology manager 200 may identify equal cost paths, if any, among the determined shortest paths for the uni-destination traffic. As discussed above, the topology manager 200 may use a previously used path or may perform other operations for the identified equal cost paths. That is, in generating the forwarding paths in a forwarding table for a particular destination, the topology manager 200 may choose one of the equal cost paths in the manners discussed above.

At block 408, the topology manager 200 may identify paths for multi-destination traffic. In addition, at block 410, the topology manager 200 may identify multi-destination traffic relay/exit paths. The topology manager 200 may identify the paths for multi-destination traffic and the multi-destination traffic relay/exit paths in any of the manners discussed above.

At block 412, the topology manager 200 may program the ASIC 202 of the member node 110 with the identified paths. In other words, the topology manager 200 may program the ASIC with forwarding tables for forwarding packets. In addition, at block 414, the topology manager 200 may distribute the identified path and cost information to another component in the member node 110. The other component in the member node 110 may use the path and cost information to perform other calculations. For instance, for aggregated ports, the uni-destination path may be used to identify the nearest member node 110 with aggregated member ports, and thus, the optimal path for sending traffic to the aggregation. As another example, for tunneled traffic and mirrored traffic, uni-destination path may be used to identify the optimal path to the tunnel/mirror entry point. In this regard, for instance, the distribution of the path and cost information at block 414 may be an internal communication between software components within a member node 110.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms. For example, the methods 300 and 400 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A network switch, comprising:
   a plurality of physical member switches interconnected by member links to exchange data plane traffic and configured to function as a single virtual switch to external devices; and
   a commander node coupled to the member switches and configured to run control and management plane protocols on behalf of the plurality of member switches,
   wherein a first member switch comprises a forwarding path calculation module configured to:
      determine an egress member switch for a packet received on the first member switch; and
      include forwarding information in an encapsulation header of the packet, thereby allowing other member switches to forward the packet within the network switch without calculating the forwarding path; and
   wherein an egress member switch comprises a forwarding module configured, upon receiving the packet, to remove the encapsulation header of the packet prior to forwarding the packet out of the network switch.

2. The network switch of claim 1, wherein the plurality of member switches include a standby node to the commander node, and wherein the standby node is configured to maintain states to operate as a backup to the commander node.

3. The network switch of claim 2, wherein the commander node is configured to manage forwarding databases and synchronize the forwarding databases with the standby node.

4. The network switch of claim 1, wherein the plurality of physical member switches form one of:
   a chain topology; or
   a ring topology.

5. The network switch of claim 1, wherein each switch of the plurality of member switches comprises a topology manager to detect inter-connects and a topology of the network switch.

6. The network switch of claim 5, wherein the topology manager of a member switch is further configured to at least one of:
   identify shortest paths for uni-destination traffic to each other member switch of the plurality of member switches;
   identify equal-cost paths between the plurality of member switches;
   identify paths for multi-destination traffic that originates on each member switch through the network switch;
   identify multi-destination traffic relay/exit paths through the network switch;
   program an application-specific integrated circuit (ASIC) of a member switch with a path for uni-destination traffic;
   program the ASIC of the member switch with path, stack relay, and stack exit for multi-destination traffic originating from each other member switch; and
   distribute path and cost information to other member switches.

7. The network switch of claim 5, wherein the topology manager of a member switch is further configured to detect the topology of the network switch based on an adjacency map that comprises a list of the member switches and peers of each of the member switches.

8. The network switch of claim 7, wherein the topology managers of the member nodes are configured to run independently of each other to detect the topology of the network switch.

9. The network switch of claim 5, wherein the topology managers of the member switches are further configured to determine changes in the topology of the network switch and detect a modified topology of the network switch based on the determined changes.

10. A method, comprising:
    running, by a commander node of a network switch, control plane protocols, wherein the network switch comprises a plurality of physical member switches inter-connected by member links to exchange data plane traffic, and wherein the network switch function as a single virtual switch to external users;
    determining, by a first member switch, an egress member switch for a packet; and
    including, by the first member switch, forwarding information in an encapsulation header of the packet, thereby allowing other member switches to forward the packet within the network switch without calculating the forwarding path; and
    removing, by the egress member switch upon receiving the packet, the encapsulation header of the packet prior to forwarding the packet out of the network switch.

11. The method of claim 10, further comprising one or more of:
    identify shortest paths for uni-destination traffic to each other member switch of the plurality of member switches;
    identifying equal-cost paths between the plurality of member switches;
    identifying paths for multi-destination traffic that originates on each member switches;
    identifying multi-destination traffic relay/exit paths through the plurality of member switches;
    program an application-specific integrated circuit (ASIC) of a member switch with a path for uni-destination traffic;
    programming the ASIC of the member switch with path, stack relay and stack exit for multi-destination traffic originating from each other member switch; or
    distributing path and cost information to other member switches.

12. The method of claim 10, further comprising:
    detecting a topology of the network switch based on an adjacency map that comprises a list of the member switches and peers of each of the member switches.

13. The method of claim 10, wherein each of the plurality of member switches comprises a topology manager,
    wherein the topology manages of the member switches run independently switch of each other to detect the topology of the network switch.

14. The method of claim 10, wherein the plurality of member switches include a standby node to the commander node, and wherein the standby node maintains states to operate as a backup to the commander node.

15. The method of claim 14, wherein the commander node manages forwarding databases and synchronizes the forwarding databases with the standby node.

16. A non-transitory computer readable medium on which is stored machine readable instructions that when executed by a processor cause the processor to perform a method, the method comprising:

running, by a commander node of a network switch, control plane protocols, wherein the network switch comprises a plurality of physical member switches inter-connected by member links to exchange data plane traffic, and wherein the network switch function as a single virtual switch to external users;

determining, by a first member switch, an egress member switch a packet;

including, by the first member switch, forwarding information in an encapsulation header of the packet, thereby allowing other member switches to forward the packet within the network switch without calculating the forwarding path; and removing, by the egress member switch upon receiving the packet, the encapsulation header of the packet prior to forwarding the packet out of the network switch.

17. The non-transitory computer readable medium of claim 16, wherein the method comprises one or more of:

identifying shortest paths for uni-destination traffic to each other member switch of the plurality of member switches;

identifying equal-cost paths between the member switches;

identifying paths for multi-destination traffic that originates on each member switch through the network switch;

identifying multi-destination traffic relay/exit paths through the network switch;

programming an application-specific integrated circuit (ASIC) of a member switch with a path for uni-destination traffic;

programming the ASIC of the member switch with path, stack relay and stack exit for multi-destination traffic originating from each other member switch; and distributing path and cost information to other member switches.

18. The non-transitory computer readable medium of claim 16, wherein the plurality of member switches include a standby node to the commander node, and wherein the standby node maintains states to operate as a backup to the commander node.

19. The non-transitory computer readable medium of claim 18, wherein the commander node manages forwarding databases and synchronizes the forwarding databases with the standby node.

20. The non-transitory computer readable medium of claim 16, wherein the method further comprises detecting a topology of the network switch based on an adjacency map that comprises a list of the member switches and peers of each of the member switches.

* * * * *